(12) United States Patent
Heiden et al.

(10) Patent No.: US 7,694,426 B2
(45) Date of Patent: Apr. 13, 2010

(54) METHOD FOR ELIMINATING SOURCES OF ERROR IN THE SYSTEM CORRECTION OF A COORDINATE MEASURING MACHINE

(75) Inventors: Michael Heiden, Wolfersheim (DE); Klaus Rinn, Heuchelheim (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 295 days.

(21) Appl. No.: 12/023,230

(22) Filed: Jan. 31, 2008

(65) Prior Publication Data

US 2008/0201971 A1    Aug. 28, 2008

Related U.S. Application Data

(60) Provisional application No. 60/891,581, filed on Feb. 26, 2007.

(30) Foreign Application Priority Data

Feb. 26, 2007  (DE) ................ 10 2007 009 591
Dec. 5, 2007   (DE) ................ 10 2007 000 999

(51) Int. Cl.
  *G01B 5/004*    (2006.01)
  *G01B 21/04*    (2006.01)
  *G06F 19/00*    (2006.01)
(52) U.S. Cl. ............................ 33/503; 33/1 M; 33/504; 324/758; 700/194

(58) Field of Classification Search .................. 33/1 M, 33/503–504, 702; 324/751, 752, 758; 702/94, 702/95, 150
See application file for complete search history.

(56) References Cited

U.S. PATENT DOCUMENTS

| 4,583,298 | A | 4/1986 | Raugh | |
|---|---|---|---|---|
| 5,798,947 | A | 8/1998 | Ye et al. | |
| 6,317,991 | B1 | 11/2001 | Rinn | |
| 6,920,249 | B2 | 7/2005 | Rinn et al. | |
| 7,286,949 | B2* | 10/2007 | McFarland et al. | 702/95 |
| 7,490,413 | B2* | 2/2009 | Liu et al. | 33/552 |
| 2001/0029674 | A1* | 10/2001 | Cutler | 33/1 M |
| 2009/0024344 | A1* | 1/2009 | Heiden et al. | 702/95 |
| 2009/0031572 | A1* | 2/2009 | Boesser et al. | 33/503 |
| 2009/0040530 | A1* | 2/2009 | Heiden | 702/95 |
| 2009/0070059 | A1* | 3/2009 | Heiden et al. | 702/95 |
| 2009/0073458 | A1* | 3/2009 | Heiden et al. | 702/95 |

OTHER PUBLICATIONS

Blasing, C., "Pattern Placement Metrology for Mask Making," SEMI, Mar. 31, 1998.

* cited by examiner

*Primary Examiner*—Yaritza Guadalupe-McCall
(74) *Attorney, Agent, or Firm*—Houston Eliseeva LLP (57) ABSTRACT

A method is disclosed for eliminating sources of error in the system correction of a coordinate measuring machine. Herein, a number j of reference structures 33 on a rigid reference object 30 are measured in a starting orientation k=0, and the starting coordinates and the reference coordinates of the reference structures 33 on the reference object 30 are determined in a number k≧3 of mutually different orientations.

10 Claims, 4 Drawing Sheets

METHOD FOR ELIMINATING SOURCES OF ERROR IN THE SYSTEM CORRECTION OF A COORDINATE MEASURING MACHINE

RELATED APPLICATIONS

This application claims priority to German Patent Application No. 10 2007 009 591.2, filed on Feb. 26, 2007, and German Patent Application No. 10 2007 000 999.4, filed on Dec. 5, 2007, and claims the benefit under 35 USC 119(e) of U.S. Provisional Application No. 60/891,581, filed on Feb. 26, 2007, all of which are incorporated herein by reference in their entirety.

BACKGROUND OF THE INVENTION

The present invention relates to a method for eliminating sources of error in the system correction of a coordinate measuring machine.

In general, at least one illumination apparatus is provided for a coordinate measuring machine. Herein, for measuring the position of a structure on a substrate or object (mask for the semiconductor industry, or a wafer), at least one laser interferometer system is used for determining a positional displacement of the substrate or object in at least one spatial direction. The at least one laser interferometer system is accommodated, together with the object or substrate and the entire coordinate measuring machine, in a climate-controlled room.

A measuring device for measuring structures on wafers and on the masks used in their production is disclosed in the lecture manuscript "Pattern Placement Metrology for Mask Making" by Dr. Carola Biasing. The lecture was given during the Semicon Education Program Conference in Geneva on 31 Mar. 1998. The description given therein constitutes the basis of a coordinate measuring machine. With regard to details concerning the functioning and design of this measuring device, reference is made specifically to this publication.

The present invention is advantageously used with a coordinate measuring machine of this type and—without restricting its generality—primarily in conjunction with a coordinate measuring machine of this type. Within the context of the present application, the terms "sample", "substrate" and the general expression "object" are taken to have the same meaning.

In the production of semiconductor chips which are arranged on wafers, with ever increasing component density, the width of the individual structures becomes ever smaller. Accordingly, the demands placed on the specifications of coordinate measuring machines that are used as measuring and inspection systems for measuring the edges and the position of the structures and for measuring the structure widths are ever increasing. In these measuring devices, it is still optical sensing methods that are favoured, as before, although the measuring accuracy demanded (currently in the region of a few nanometers) lies far below the resolving power achievable with the light wavelengths used (in the near UV spectral region). The advantage of optical measuring devices lies in their substantially less complex design and simpler use compared with systems with other types of sensing—e.g. using X-rays or electron beams.

As a rule, the positions of such structural elements are determined relative to a reference coordinate system of the substrate (mask or wafer) or relative to a coordinate system of the coordinate measuring machine. Together with the position of the measuring table measured by interferometric means, this results in the coordinates of the structure. The structures on wafers or on the masks used for their exposure permit only extremely small tolerances. In order to test these structures, a very high degree of accuracy is therefore always required (currently in the nanometer range). A method and a measuring device for determining the position of such structures is known from the German published application DE 100 47 211 A1. With regard to details of said position determination, reference is therefore made specifically to this document.

The German patent DE 197 34 695 C1 relates to a method for determining a correction function for elimination of coordinate-dependent measuring errors in a coordinate measuring machine through self-calibration. The invention is based on the realisation that there are special components of the correction function which are not unambiguously determined or are subject to very large errors. This mainly concerns components which, in the calibration measurements of all orientations of a reference object used for the calibration, always coincide with themselves (exactly or only approximately), i.e. the rotationally symmetrical components are invariant for the rotations of the reference object that are carried out.

The U.S. Pat. No. 4,583,298 describes the self-calibration of a coordinate measuring machine with the aid of a calibration plate, on which a grid is arranged. The positions of the grid points are not calibrated, however. The grid plate is laid on the object table of the coordinate measuring machine and the positions of its grid points are measured. The same grid plate is then further rotated two or more times through, respectively, 90° about a rotation axis and, in each of the set orientations, the positions of the grid points are measured. The measuring results are mathematically rotated in reverse and various correction factors and tables are optimised so that the reverse rotated data sets have a better agreement. U.S. Pat. No. 4,583,298 concerns itself in detail with the problem of faulty or unreliable corrections. The cause has been identified as being errors in the measuring of the measurement values used for correction determination. It is shown that a mathematically unambiguous correction is only achieved when more than two different rotation positions are measured with the same grid plate. For this purpose, the grid plate is laid, as previously known, on the object table and the positions of its grid points are measured in a plurality of orientations of the grid plate. The orientations are achieved, for example, by multiple rotation through 90° about their mid-point. However, the grid plate must then be displaced to a totally different position on the object table. Once there, the measurement of the positions of its grid points is repeated in a plurality of orientations, as previously known. It is essential herein that the same grid plate must be displaced on the object table.

U.S. Pat. No. 5,798,947 describes a method for self-calibration of tables of a 2-D metrology measuring machine. A plate comprising an N×N grid of marks is used in order to determine the table positions relative to a Cartesian coordinate system. From this a rotation function Gx(x,y) and Gy(x, y) is determined. For the self-calibration, the mask is rotated through respective 90° steps. In addition, measurement with a displaced mask is carried out. Based on the teaching of U.S. Pat. No. 5,798,947, it is not possible to determine error components that provide the same distortion in all the individual measurements.

SUMMARY OF THE INVENTION

It is therefore an object of the present invention to provide a method with which sources of error in the system correction of a coordinate measuring machine can essentially be eliminated.

This object is achieved according to the invention by a method which, for a number j of reference structures on a rigid reference object in a starting orientation k=0 of the reference object, determines the starting coordinates $\vec{r}_0$ of the reference structures. In a number k≧3 of respective different orientations of the reference object, the coordinates $\vec{r}_k$ of the reference structures are determined. The different orientations are set by at least one rotation about one axis, in each case, and at least one displacement.

By means of at least two rotation functions about the respective different rotation axes and at least one displacement function by at least one vector, a different orientation of the substrate is set. The coordinates $\vec{r}_k$ of the reference structures of the respectively created different orientations of the reference object (30) are measured. The corrected $\vec{r}_k$ are represented on the starting coordinates $\vec{r}_0$ of the starting orientation of the reference structures.

By means of at least one rotation function about the at least one rotation axis and at least two displacement functions by at least two vectors, a different orientation of the substrate is set. The coordinates $\vec{r}_k$ of the respectively created different orientations of the reference object (30) are determined. The coordinates $\vec{r}_k$ are represented on the determined starting coordinates $\vec{r}_0$ of the starting orientation of the reference structures.

The starting coordinates $\vec{r}_0$ and the calibration coordinates $\vec{r}_k$ have a coordinate-dependent correction function applied to them which is described by an approximation with initially unknown fit parameters and a number N of predetermined linear independent fit functions. The calibration coordinates with the correction function applied to them are brought back into the starting orientation by means of the respective rotation functions and displacement functions.

The fit parameters and the rotation angles and the displacements are calculated such that, for each reference structure, all the corrected, reverse rotated and/or reverse displaced calibration coordinates $\vec{r}_k$ and the corrected starting coordinates $\vec{r}_0$ have the best possible match.

Thus a continuous correction function which can be applied to all the coordinates of structures to be measured is created, although it should be noted that, from the fit functions or a selection thereof, no linear combinations can be formed which, for all the rotations and displacements carried out, coincide with themselves.

On the reference object, the starting coordinates and the calibration coordinates are measured with a first, fixed rotation axis. On the reference object, the starting coordinates and the calibration coordinates are once again measured with a second, fixed rotation axis. A measurement is also carried out with a displacement of the starting coordinates and the calibration coordinates.

On the reference object, the starting coordinates and the calibration coordinates are measured with a first, fixed rotation axis. Further, on the reference object, the starting coordinates and the calibration coordinates are once again measured with a first, fixed displacement, and the starting coordinates and the calibration coordinates are also measured with a second displacement.

In one embodiment of the invention, for the predetermined fit functions, all the rotationally symmetrical linear combinations and displacement symmetrical linear combinations of an arbitrary number P≦N of the fit functions are determined with the fit parameters $s_i$, which fulfil the symmetry conditions for the rotation functions and the displacement functions. Given the existence of a rotationally symmetrical linear combination and a displacement symmetrical linear combination of this type, the previous set of linear independent fit functions is replaced by a new set of linear independent fit functions. These new fit functions are each linear combinations of the previous ones and cover the same function space. Symmetrical components are deleted because they cannot be determined. True errors are also no longer corrected with these components. The aforementioned method steps are repeated until there is no longer a linear combination which fulfils the symmetry conditions for the rotation functions and the displacement function. Using the set of fit functions generated by the M-times repetition of the above method steps, the correction function is calculated.

For the measurements in various orientations, the reference object covers as much as possible of the whole displacement range of a measuring table of the coordinate measuring machine. The reference object is usually square and the first rotation axis runs through the intersection of the diagonals. In a preferred embodiment of the method, each new orientation produced by rotation of the reference object is based on a whole number multiple of 90°.

BRIEF DESCRIPTION OF THE DRAWINGS

Exemplary embodiments of the invention will now be described and their advantages will be explained in greater detail by reference to the accompanying drawings, in which.

DETAILED DESCRIPTION OF THE PREFERRED EMBODIMENTS

Figure 1:
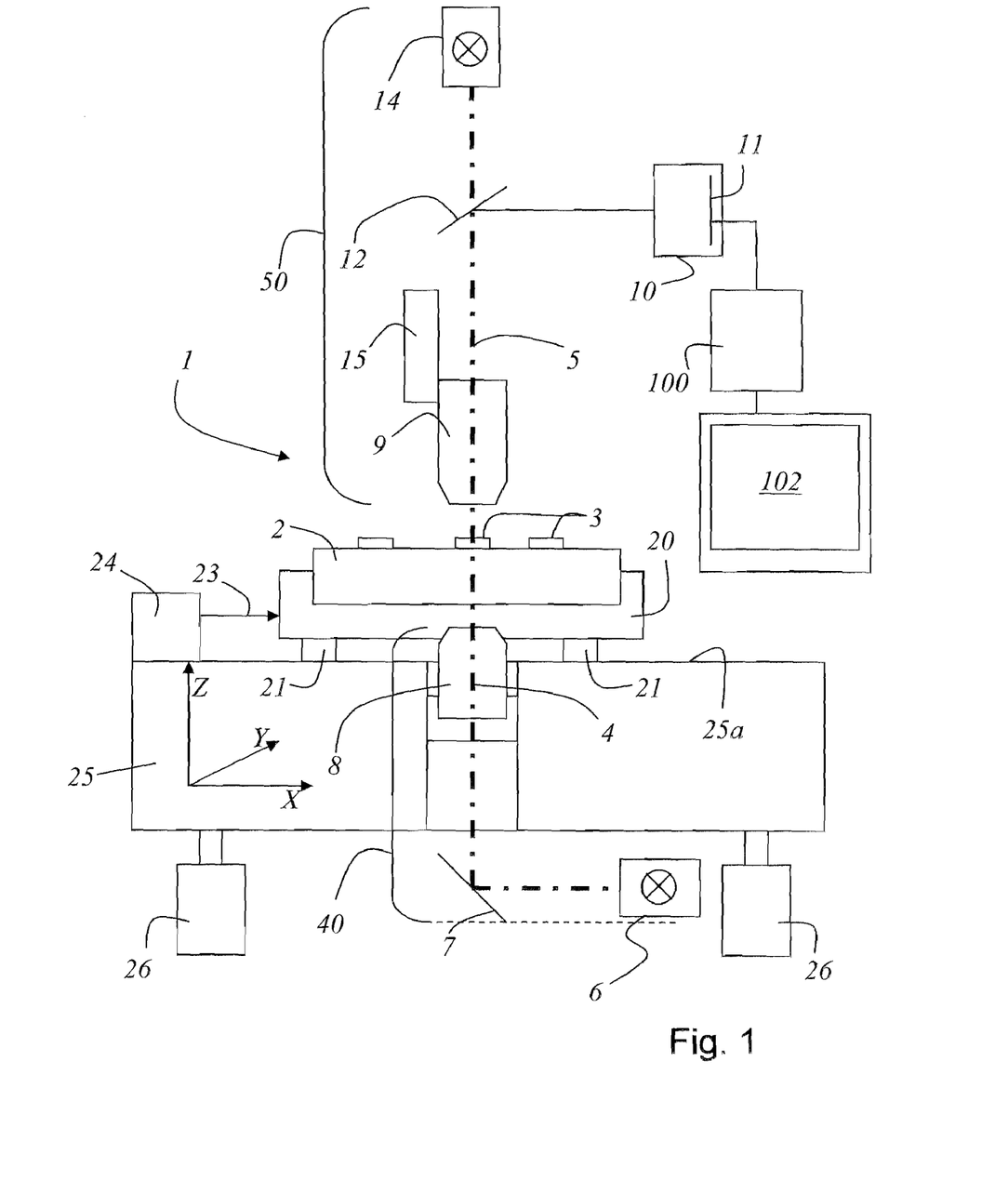
FIG. 1 shows schematically a coordinate measuring machine according to the prior art.

FIG. 1 shows a schematic representation of a coordinate measuring machine as has long been known from the prior art. In the description that follows, the coordinate measuring machine is referred to as the "device". It should also be noted that in the description that follows and in the drawings, the same elements are denoted with the same reference signs.

The device 1 comprises a measuring table 20, which is arranged displaceable on air bearings 21 in the X-coordinate direction and in the Y-coordinate direction in a plane 25a.

Other bearings than the air bearings can also be used for the mounting of the measuring table 20. The plane 25a is formed from one element 25. In a preferred embodiment, the element 25 is made from granite. However, it is obvious to a person skilled in the art that the element 25 can also be made from another material which makes a precise plane available for the displacement of the measuring table 20. The position of the measuring table is measured with at least one laser interferometer 24, which, for measuring, emits a light beam 23, which hits the measuring table 20. The element 25 itself is mounted on oscillation dampers 26 in order to insulate the device against building oscillations.

A substrate 2 which carries the structures 3 to be measured is placed on the measuring table 20. The substrate 2 can be illuminated with a transmitted light illumination apparatus 6 and/or a reflected light illumination apparatus 14. The transmitted light illumination apparatus 6 is provided in an optical arrangement 40. The reflected light illumination apparatus 14 is also provided in an optical arrangement 50. The optical arrangement 50 comprises the transmitted light illumination apparatus, a deflecting mirror and a condenser. By means of the deflecting mirror, the light from the transmitted light illumination apparatus 6 is directed towards the condenser. The further optical arrangement 50 comprises the reflected light illumination apparatus 14, a beam-splitter 12, the measuring objective 9 and a displacing device 15 assigned to the measuring objective 9. With the displacing device 15, the measuring objective 9 can be displaced in the Z-coordinate direction (e.g. for focusing). The measuring objective 9 collects the light emerging from the substrate 2 and deflects it out of the reflected light illumination axis 5 by means of the semi-silvered deflecting mirror 12. The light then passes to a camera 10 which is provided with a detector 11. The detector 11 is linked to a computer system 16 which generates digital images from the measured values detected by the detector 11.

The measuring objective 9 is a high-resolution apochromatically corrected microscope objective designed for light in the UV region. The detector 10 is constructed in the form of a high-resolution CCD camera and is controlled and has its output read out by a first computer evaluation and analysis system 100 shown in FIG. 1.

Figure 2:
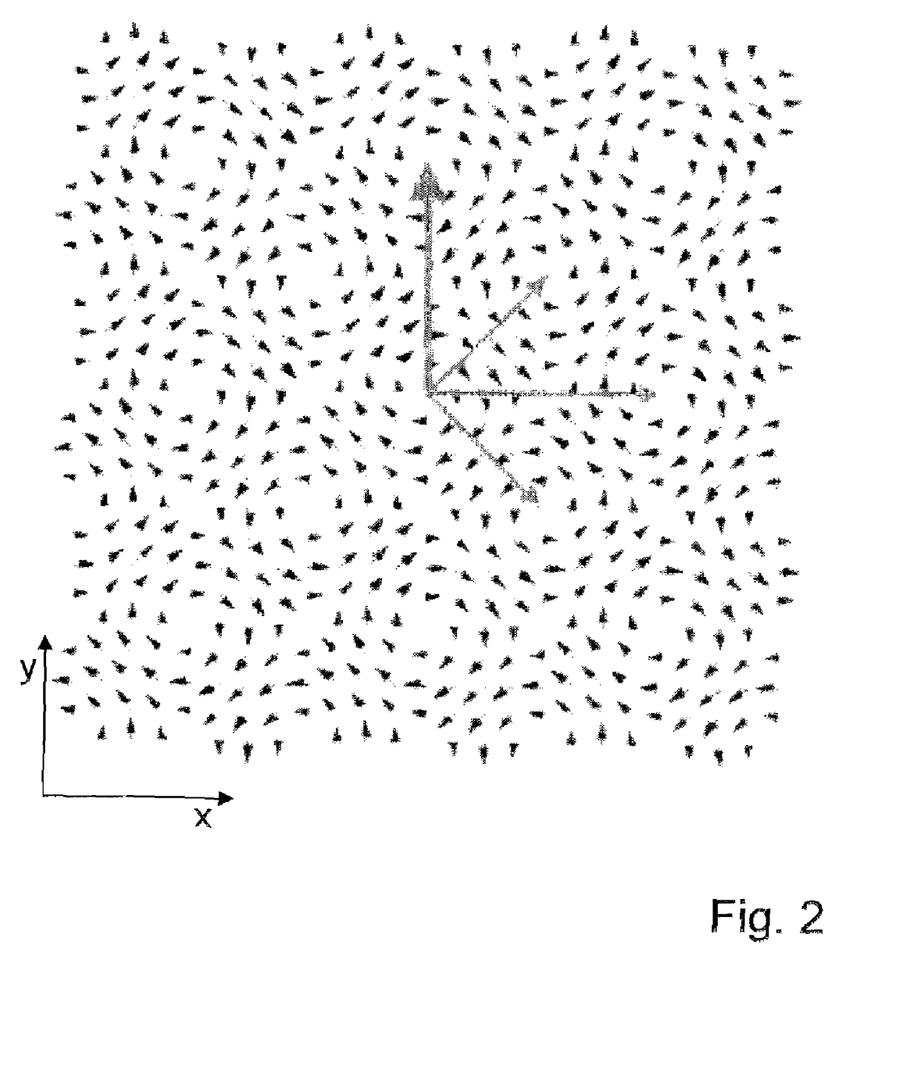
FIG. 2 shows an error image which, on rotation by 90° and displacement, coincides with itself.

FIG. 2 shows an error image for rotations by 90° which, on displacement, for example, by the vectors shown and rotation by 90°, coincides with itself. In the method claimed by the patent DE 197 34 695 C1, for a rotation axis separation $\vec{x}$, all the functions coincide with themselves on rotation about the two rotation axes and through 90°. U.S. Pat. No. 5,798,947 describes a displacement of the mask by $\vec{y}$ functions which, on rotation about an axis by 90° and additional displacement by $\vec{y}$, coincide with themselves.

If, for example $$\vec{x} = \vec{y} = (0 \ s)^T = \begin{pmatrix} 0 \\ s \end{pmatrix},$$

then a non-identifiable error component for both methods is given by:

$$\vec{f}(x, y) = \begin{pmatrix} \sin(k \cdot y) \\ -\sin(k \cdot x) \end{pmatrix} \text{ for } k = \frac{2\pi}{s}$$

This results in the error image shown in FIG. 2 which coincides with itself both for rotations by 90° and also for displacements by the vector $\vec{x}$. Further displacements with invariance are also shown in FIG. 2. There are many other invariant error components. In the example shown in FIG. 2, these are, for example, all functions with whole-number multiples of $\vec{k}$.

Figure 3:
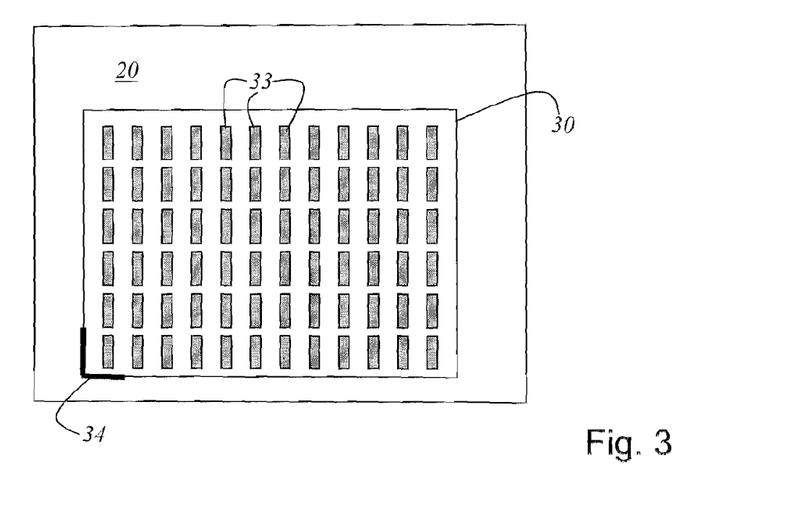
FIG. 3 shows a possible configuration of an embodiment of a reference object.

FIG. 3 shows a rigid reference object 30 which, in order to carry out a self-calibration in the starting orientation k=0, is laid on the measuring table 20 of the coordinate measuring machine 1. The current orientation of the reference object 30 is indicated by a marking 34. In the starting orientation, this appears in the lower left corner of the reference object 30. The reference object 30 is selected to be large enough so that it covers the entire measuring range of the coordinate measuring machine and, accordingly, covers almost the entire displacement range of the measuring table 20.

A common mask holder which is not shown for reasons of simplification, designed for the measuring of masks serves to accommodate the reference object 30. It is thus known to mount the mask in restraining force-free manner on three support points. It is also conceivable that the reference object 30 is inserted directly and without a mask holder in the measuring table 20. The bending produced by its own weight is calculated and, reckoned out of the measured coordinates of the structures 33 on the mask. Other mask holders draw the mask down with vacuum feet. However, this generates bending of the mask that cannot be precisely described. In the example under consideration, the reference object 30 (and later, other reference objects) is always laid abutting the lower edge of the measuring table 20, which also serves as a support for the masks to be measured and for which displaceable support points for different mask sizes are available. On the reference object 30, a number j of reference structures 33 is selected, the coordinates of which should be measured for carrying out the self-calibration. Although lines are shown as reference structures 33 for the reference object shown in FIG. 3, it is obvious to a person skilled in the art that the reference structures 33 can also have other forms.

The fundamental concept of the invention is illustrated in FIGS. 4A to 4B and FIGS. 5A to 5B. Further measurements with a further rotation axis or a further displacement vector can be added thereto. The non-determinable error components must have, for all these measurements, the property in common that they coincide with themselves for the rotations and the various displacements. Thus the non-determinable error components are always more distinctive. In the case of the sine function described above, the error component is invariant for displacements s and t in the X-coordinate or the Y-coordinate directions. If, to a good approximation, the following applies: there are natural numbers n, m for which $$\frac{m}{n} \cong \frac{s}{t},$$

then k is chosen such that $$k = \frac{2\pi m}{s}$$

or (almost equivalent)

$$k = \frac{2\pi n}{t}.$$

In concrete terms, s=14 mm and t=10 mm, so that at least m=7 and n=5. Thus, $$k = \frac{2\pi 7}{14\,\text{mm}} = \pi\,\text{mm}^{-1} = \frac{2\pi 5}{10\,\text{mm}}.$$

This corresponds to a period length of 0.5 mm or a whole-number fraction thereof.

This procedure appears initially to be relatively unhelpful, since the wavelength of the non-observed error sources is merely reduced, but they are not themselves eliminated. However, these invariant error components are a problem of self-calibration that is practically insoluble. It can be assumed, however, from the technical structure of a coordinate measuring device that very short wavelength error components are practically unable to occur. Thus, for example, short-wavelength unevenness in the mirrors within the beam diameter of an interferometer beam (typically 4 mm) are averaged or guidance errors are suppressed by the diameter of the air bearings of a few centimeters to small length scales.

Thus, practically all the error components occurring are detectable and therefore correctable. The self-calibration is measured based on substrate measurements in at least two different orientations which differ by 90°, and a displacement. Also, substrate measurements in rotation positions about a second rotation axis and a displacement are conceivable.

Figure 4A:
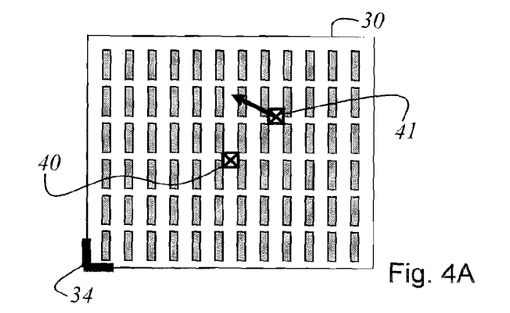
FIG. 4A shows the reference object in a starting orientation k=0.
Figure 4B:
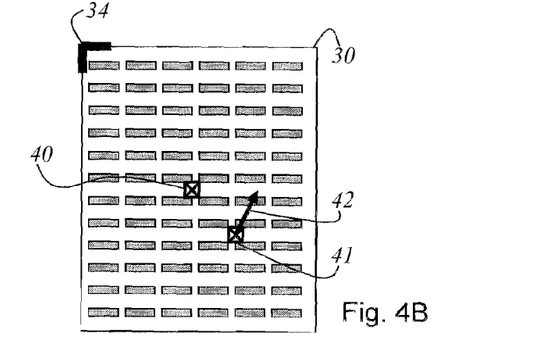
FIG. 4B shows the reference object in an orientation k=1 generated by rotation.

FIG. 4A shows that initially the reference object 31 is placed in the starting orientation on the mask holder. In this starting orientation k=0 of the reference object 30, the starting coordinates (of the position vector) $\vec{r}_{1/0}$ of the j selected reference structures 33 are measured. Thereafter, as shown in FIG. 4B, the reference structures 33 of the reference object 30 are measured in at least one other orientation of the reference object 30. For this purpose, the reference object 30 is rotated about the first rotation axis 41. This "other" orientation is different from the reference orientation and the current or other orientation can be deduced from the marking 34 in the respective drawings.

FIG. 4B shows the reference object 30 in the first other orientation k=1. It is generated from the starting orientation by a 90° rotation about the first rotation axis 41 of the reference object 30. The marking 34 appears in the first other orientation at the left upper corner of the reference object 30. In this first other orientation k=1, the calibration coordinates $\vec{r}_{1/1}$ of the j reference structures 33 of the first reference object 33 are measured.

Figure 4C:
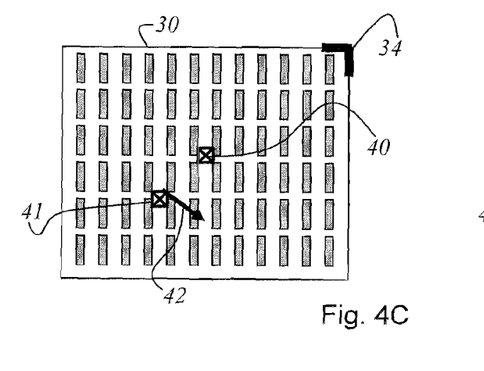
FIG. 4C shows the reference object in an orientation k=2 generated by another rotation about another rotation axis.

FIG. 4C shows the reference object 30 in the second other orientation k=2. It is generated by a 180° rotation about a second rotation axis 42 of the reference object 30. The marking 34 appears in the second other orientation in the right upper corner of the reference object 30. In this second other orientation k=2, the calibration coordinates $\vec{r}_{1/2}$ of the j reference structures 33 are measured. It can be seen that the orientation in FIG. 4A supplies no further information relative to the orientation 4C. If an error component is not observed in FIG. 4A on rotation by 90°, then it will also not be observed on a double rotation by 90° (a rotation by exactly 180°). However, a benefit in the form of better statistics can be drawn therefrom.

Figure 4D:
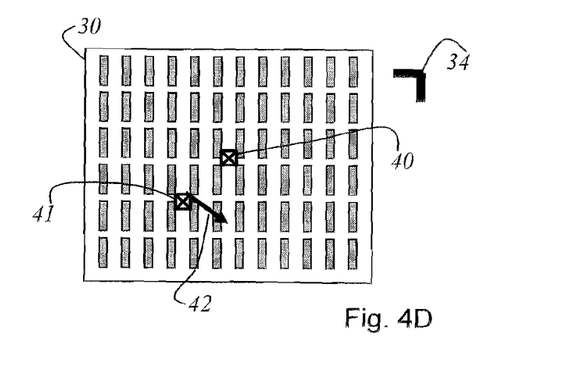
FIG. 4D shows the reference object in an orientation k=3 generated by a displacement.

FIG. 4D shows the reference object 30 in the third other orientation k=3. It is generated from the second orientation by a displacement of the reference object 30 by the vector 43. The marking 34 shows what effect this displacement has on the reference object 30. In this third other orientation k=3, the calibration coordinates $\vec{r}_{1/3}$ of the j reference structures 33 are measured.

Figure 5A:
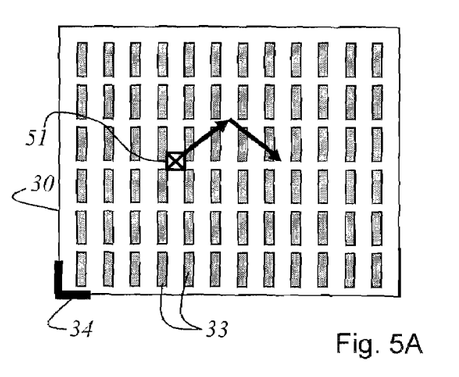
FIG. 5A shows the reference object in a starting orientation k=0.
Figure 5B:
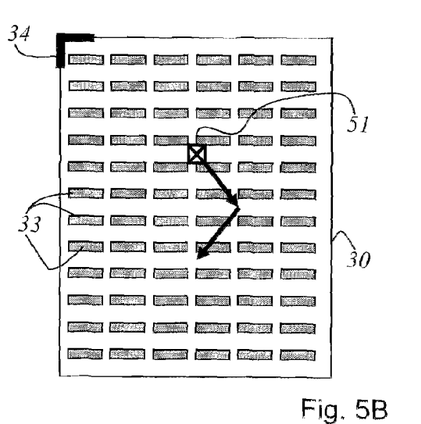
FIG. 5B shows the reference object in an orientation k=1 generated by a rotation.

A further embodiment of the self-calibration is illustrated in FIGS. 5A and 5B. The orientations shown and set in FIGS. 5A to 5D are obtained by rotation plus a displacement. This is identical to rotations about different axes, although for the sake of completeness, this embodiment will also be described. Similarly to FIG. 4A, FIG. 5A shows that initially the reference object 30 is placed in the starting orientation on the mask holder. In this starting orientation k=0 of the reference object 30, the starting coordinates (of the position vector) $\vec{r}_{1/0}$ of the j selected reference structures 33 are measured. Thereafter, as shown in FIG. 5B, the reference structures 33 of the reference object 30 are measured in at least one other orientation of the reference object 30. For this purpose, the reference object 30 is rotated about a rotation axis 51. This calibration orientation is different from the starting orientation and the current orientation can be derived in FIGS. 5B and 5C from the marking 34.

FIG. 5B shows the reference object 30 in the first calibration orientation k=1. It is generated by a 90° rotation about the rotation axis 51 of the reference object 30. The marking 34 appears in the first calibration orientation in the left upper corner of the reference object 30. In this first calibration orientation k=1, the calibration coordinates $\vec{r}_{1/1}$ of the j reference structures 33 of the first reference object 33 are measured.

Figure 5C:
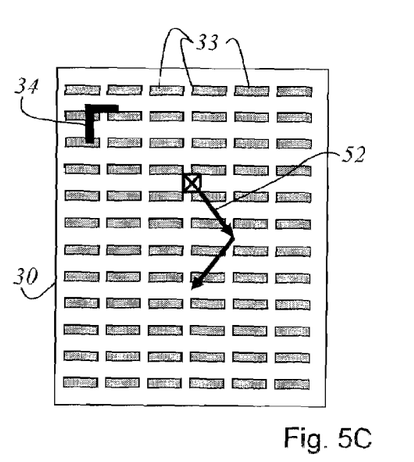
FIG. 5C shows the reference object in an orientation k=2 generated by a first displacement.

FIG. 5C shows the reference object 30 in the second calibration orientation k=2. It is generated from the orientation of FIG. 5B by a first displacement by the first vector 52 of the reference object 30. The marking 34 appears in the second calibration orientation to be displaced in the left upper corner of the reference object 30. In this second calibration orientation k=2, the calibration coordinates $\vec{r}_{1/2}$ of the j reference structures 33 are measured.

Figure 5D:
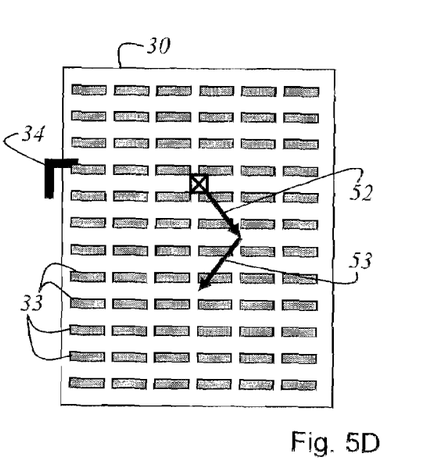
FIG. 5D shows the reference object in an orientation k=3 generated by a second displacement.

FIG. 5D shows the reference object 30 in the third calibration orientation k=3. It is generated from the orientation shown in FIG. 5C by a displacement of the reference object 30 by a second vector 53. The marking shows 34 what effect this displacement has on the reference object 30. In this third calibration orientation k=3, the calibration coordinates $\vec{r}_{1/3}$ of the j reference structures 33 are measured.

It is obvious to a person skilled in the art that the different orientations of the reference object (30) shown in FIGS. 4A to 4D and 5A to 5D can take place in any arbitrary order.

Considered mathematically, a correction function for elimination of the coordinate-dependent measuring errors of a coordinate measuring machine, said correction function being dependent on the measuring location, is a two-dimensional or three-dimensional function $\vec{K}(\vec{r})$. In practice, the correction function is always continuous and differentiable. Through use of this correction function $\vec{K}(\vec{r})$ on a measured error-laden raw coordinate $\vec{r}$ (what is meant is the position vector) of a structure of an arbitrary measured object, the associated corrected coordinate $\vec{r}_{korr} = \vec{r} + \vec{K}(\vec{r})$ is obtained.

In order to determine the correction function $\vec{K}(\vec{r})$, it is approximated by a series expansion of a set of predetermined fit functions $\vec{k}_i(\vec{r})$. The following therefore applies:

$$\vec{K}(\vec{r}) = \sum_{i=0}^{N} a_i \cdot \vec{k}_i(\vec{r})$$

where $a_i$=fit parameter and N=number of predetermined fit functions $\vec{k}_i(\vec{r})$.

In order to determine the correction function $\vec{K}(\vec{r})$, therefore, the fit parameters $a_i$ for the fit functions $\vec{k}_i(\vec{r})$ must be determined such that the correction is optimal, that is, the residual error is minimal or zero.

The invention is based on the recognition that there are special components of the correction function $\vec{K}(\vec{r})$ which are not unambiguously determined or are subject to very large errors. These are largely components which, during calibration measurements of all the orientations of a reference object used for calibration, always coincide with themselves (exactly or approximately), that is, the components with rotational symmetry are invariant for the rotations of the reference object as carried out, and the displacement symmetrical components are invariant for the rotations performed. Each involves a linear combination S(r) of fit functions $\vec{k}_i(\vec{r})$. The symmetry condition $S(r)=D_k S(r)$ then applies. As a special case of the linear combination, this could involve a single identifiable fit function $\vec{k}_i(\vec{r})$.

These rotationally symmetrical and displacement symmetrical components in the form of the linear combination $\vec{S}(\vec{r})$ make no—or a very imprecise—contribution to an approximation of the ideal—exactly right—correction function $\vec{K}(\vec{r})$. The correction function would make a contribution, but it cannot be determined from the data. Thus, the presence of such rotationally symmetrical components and displacement symmetrical components lead thereto that the fit parameters $a_i$ of the fit functions $\vec{k}_i(\vec{r})$ cannot be unambiguously determined. In order to improve the error correction, according to the invention, they are therefore removed from the series expansion of the correction function $\vec{K}(\vec{r})$. This is harmless if these error components are less strongly expressed.

All combinations of rotations about arbitrary rotation axes plus arbitrary displacements can always be represented mathematically as rotation about a fixed arbitrary axis plus a corresponding displacement. Mathematically this involves the special Euclidian group SE(2). The determined starting coordinates $\vec{r}_0$ of the starting orientation of the reference structures (33) are made, by means of at least two rotation functions about the different rotation axes and at least one displacement function by at least one vector, to coincide with the coordinates $\vec{r}_k$ of the respective different orientations of the reference object (30).

A further embodiment is that the determined starting coordinates $\vec{r}_0$ of the starting orientation of the reference structures (33) are made, via at least one rotation function about the at least one rotation axis and at least two displacement functions by at least two vectors, to coincide with the coordinates $\vec{r}_k$ of the respectively created different orientations of the reference object (30).

A further advantageous embodiment of the invention is that the number of orientations that are measured is $\geq 4$. To achieve this, 3 different rotation axes are used so that the smallest common multiple of the separations of the individual rotation axes is particularly large. Thus, the immeasurable error can be expected to have a very small period.

The invention has been described making reference to particular embodiments. However, it is obvious to a person skilled in the art that derivations and amendments of the invention can be made without thereby departing from the protective scope of the claims that follow.

What is claimed is:

1. A method for eliminating sources of error in the system correction of a coordinate measuring machine, comprising the following steps:
   a) determining for a number j of reference structures on a rigid reference object in a starting orientation k=0 of the reference object, the starting coordinates $\vec{r}_0$;
   b) determining in a number $k \geq 3$ of mutually different orientations of the reference object, the coordinates $\vec{r}_k$ of the reference structures;
   c) representing the different orientations are represented by at least two rotations about respective significantly different axes.

2. The method according to claim 1, wherein the starting coordinates $\vec{r}_0$ and the calibration coordinates $\vec{r}_k$ have a coordinate-dependent correction function applied to them which is described by an approximation with initially unknown fit parameters and a number N of predetermined, linear independent fit functions, wherein the calibration coordinates with the correction function applied to them are brought back into the starting orientation by means of adapted rotation functions and displacement functions.

3. The method according to claim 2, wherein the fit parameters are calculated such that, for each reference structure, all the corrected, reverse rotated and/or reverse displaced calibration coordinates $\vec{r}_k$ and the corrected starting coordinates $\vec{r}_0$ have the best possible match.

4. The method according to claim 3, wherein a continuous correction function which can be applied to all the coordinates of structures to be measured is created, wherein from their fit functions or a selection thereof, no linear combinations can be formed which, for all the rotations and displacements carried out, coincide with themselves.

5. The method according to claim 1, wherein on the reference object, the starting coordinates and the calibration coordinates are measured with a first, fixed rotation axis, that on the reference object, the starting coordinates and the calibration coordinates are once again measured with a second, fixed rotation axis and that the starting coordinates and the calibration coordinates are also measured with a displacement.

6. The method according to claim 1, wherein on the reference object, the starting coordinates and the calibration coordinates are measured with a first, fixed rotation axis, that on the reference object, the starting coordinates and the calibration coordinates are once again measured with a first, fixed displacement, and that the starting coordinates and the calibration coordinates are also measured with a second displacement.

7. The method according to claim 1, wherein:
a) for the predetermined fit functions, all the rotationally symmetrical linear combinations and displacement symmetrical linear combinations of an arbitrary number P<N of the fit functions are determined with the fit parameters $s_t$, which fulfil the symmetry conditions for the rotation functions and the displacement functions,
b) that given the existence of a rotationally symmetrical linear combination of this type and a displacement symmetrical linear combination of this type, the previous set of linear independent fit functions is replaced by a new set of linear independent fit functions, wherein these new fit functions are each linear combinations of the previous ones and cover the same function space and wherein one of the new fit functions, specifically that for the displacements and rotations of the reference object is a symmetrical linear combination,
c) that the rotationally symmetrical linear combination and the displacement symmetrical linear combination is deleted from the set of fit functions so that their number is then only N−1,
d) that the above method steps a), b), c) are repeated until there is no longer a linear combination which fulfils the symmetry conditions for the rotation functions and the displacement function,
e) and that using the set of fit functions generated by the M-times repetition of the above method steps a), b), c), the correction function is calculated.

8. The method according to claim 1, wherein the reference object covers the whole displacement range of a measuring table of the coordinate measuring machine.

9. The method according to claim 1, wherein the reference object is square and the first rotation axis runs through the intersection of the diagonals.

10. The method according to claim 1, wherein each new orientation produced by rotation of the reference object is based on a whole number multiple of 90°.

* * * * *